United States Patent
Anshel et al.

(10) Patent No.: US 9,071,408 B2
(45) Date of Patent: Jun. 30, 2015

(54) COMMUNICATION SYSTEM

(75) Inventors: Iris Anshel, Tenafly, NJ (US); Dorian Goldfeld, Tenafly, NJ (US)

(73) Assignee: SecureRF Corporation, Shelton, CT (US)

( * ) Notice: Subject to any disclaimer, the term of this patent is extended or adjusted under 35 U.S.C. 154(b) by 721 days.

(21) Appl. No.: 13/369,811

(22) Filed: Feb. 9, 2012

(65) Prior Publication Data

US 2013/0208887 A1    Aug. 15, 2013

(51) Int. Cl.
| | |
|---|---|
| H04L 1/00 | (2006.01) |
| H04L 29/06 | (2006.01) |
| H04L 9/00 | (2006.01) |
| H04L 9/06 | (2006.01) |

(52) U.S. Cl.
CPC . H04L 9/008 (2013.01); H04L 9/06 (2013.01)

(58) Field of Classification Search
CPC .................................. H04L 9/06; H04L 9/008
USPC ............................ 380/255, 277, 285; 713/150
See application file for complete search history.

(56) References Cited

U.S. PATENT DOCUMENTS

| | | | |
|---|---|---|---|
| 6,493,449 B2 * | 12/2002 | Anshel et al. | 380/30 |
| 2002/0001382 A1 * | 1/2002 | Anshel et al. | 380/30 |
| 2006/0280308 A1 * | 12/2006 | Anshel et al. | 380/285 |
| 2010/0254534 A1 * | 10/2010 | Anshel et al. | 380/44 |
| 2013/0208887 A1 * | 8/2013 | Anshel et al. | 380/255 |
| 2014/0019747 A1 * | 1/2014 | Anshel et al. | 713/150 |

* cited by examiner

*Primary Examiner* — Abu Sholeman
(74) *Attorney, Agent, or Firm* — Moritt Hock & Hamroff LLP; Steven S. Rubin, Esq.

(57) ABSTRACT

A system effective to communicate a message between two devices. A first device may include a plaintext to monoid element module effective to receive a plaintext message and apply a first function to the plaintext message to produce a first monoid element. A monoid element evaluator module may be effective to receive and insert submonoid generators into a monoid expression to produce a second monoid element in response. An encryption device module may be effective to apply a second function to the first monoid element, the second monoid element, the monoid expression, and a third monoid element to produce an encrypted plaintext message. Decryption may be performed on the encrypted plaintext message knowing the private key which includes the first function, the second function, the third monoid element and the submonoid generators list.

20 Claims, 3 Drawing Sheets

COMMUNICATION SYSTEM

BACKGROUND OF THE INVENTION

In a symmetric or private key encryption communication system, two devices in possession of a common secret or private key can perform both encryption and decryption using the secret key. A plaintext message may be encrypted using the secret key to produce encrypted plaintext or a cyphertext. The cyphertext may be decrypted using the secret key to re-produce the plaintext. Examples of such protocols date back to early history, with the classic Caesar cipher being an early instance of a secret key being used to secure communications. Symmetric encryption protocols typically take one of two forms. The stream cipher is a protocol where individual bits are encrypted one at a time. The Caesar cipher, and German Enigma machine are both instances of such protocols. A block cipher is a protocol where the data to be encrypted is first broken into a union of blocks of a fixed size, and then each of said blocks is encrypted by the protocol.

SUMMARY OF THE INVENTION

One embodiment of the invention is a device effective to communicate a message. The device may include a memory, wherein the memory is effective to include a first function, a list of submonoid generators, a second function, and a first monoid element. The device may further include a first module in communication with the memory, the first module effective to receive a message and apply the first function to the message to produce a second monoid element. The device may further include a second module in communication with the memory, the second module effective to receive and insert the submonoid generators into at least one monoid expression to produce a third monoid element. The device may further include a third module in communication with the memory, in communication with the first module, and in communication with the second module, the third module effective to apply the second function to the first monoid element, the second monoid element, the monoid expression, and the third monoid element to produce an encrypted message.

Another embodiment of the invention is a device effective to decrypt an encrypted message. The device may include a memory, wherein the memory is effective to include a first function, a list of submonoid generators, a second function, and a first monoid element. The device may further include a first module in communication with the memory, the first module effective to receive a monoid expression in the encrypted message, the first module effective to insert the submonoid generators into the monoid expression to produce a second monoid element. The device may further include a second module in communication with the memory and the first module. The second module may be effective to receive a third monoid element in the encrypted message, receive the second function, and receive the first monoid element. The second module may be further effective to receive the second monoid element, and apply the second function to the third monoid element, to the inverse of the second monoid element, and to the inverse of the first monoid element to produce a fourth monoid element. The device may further include a third module in communication with the memory and the second module, the third module effective to apply the first function to the fourth monoid element to produce the message.

Another embodiment of the invention is a system effective to communicate a message. The system may comprise a first device in communication with a second device over a network. The first device may include a first memory. the first memory may be effective to include a first function, a list of submonoid generators, a second function, and a first monoid element. The first device may include a first module in communication with the first memory, the first module effective to receive a message and apply the first function to the message to produce a second monoid element. The first device may include a second module in communication with the memory. The second module may be effective to receive and insert the submonoid generators into at least one monoid expression to produce a third monoid element. The first device may include a third module in communication with the memory, in communication with the first module, and in communication with the second module. The third module may be effective to apply the second function to the first monoid element, the second monoid element, the monoid expression, and the third monoid element to produce an encrypted message including a fourth monoid element and the monoid expression. The second device may include a second memory, wherein the second memory is effective to include the first function, the list of submonoid generators, the second function, and the first monoid element. The second device may include a fourth module in communication with the second memory. The fourth module may be effective to receive the monoid expression in the encrypted message, the fourth module effective to insert the submonoid generators into the monoid expression to re-produce the third monoid element. The second device may include a fifth module in communication with the second memory and the fourth module. The fifth module may be effective to receive the fourth monoid element in the encrypted message, receive the second function, receive the first monoid element, and receive the third monoid element. The fifth module may further be effective to apply the second function to the fourth monoid element, the inverse of the first monoid element and the inverse of the third monoid element to produce the second monoid element. The second device may include a sixth module in communication with the second memory and the fifth module, the sixth module effective to apply the first function to the second monoid element to re-produce the message.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION OF THE PREFERRED EMBODIMENT(S)

Figure 1:
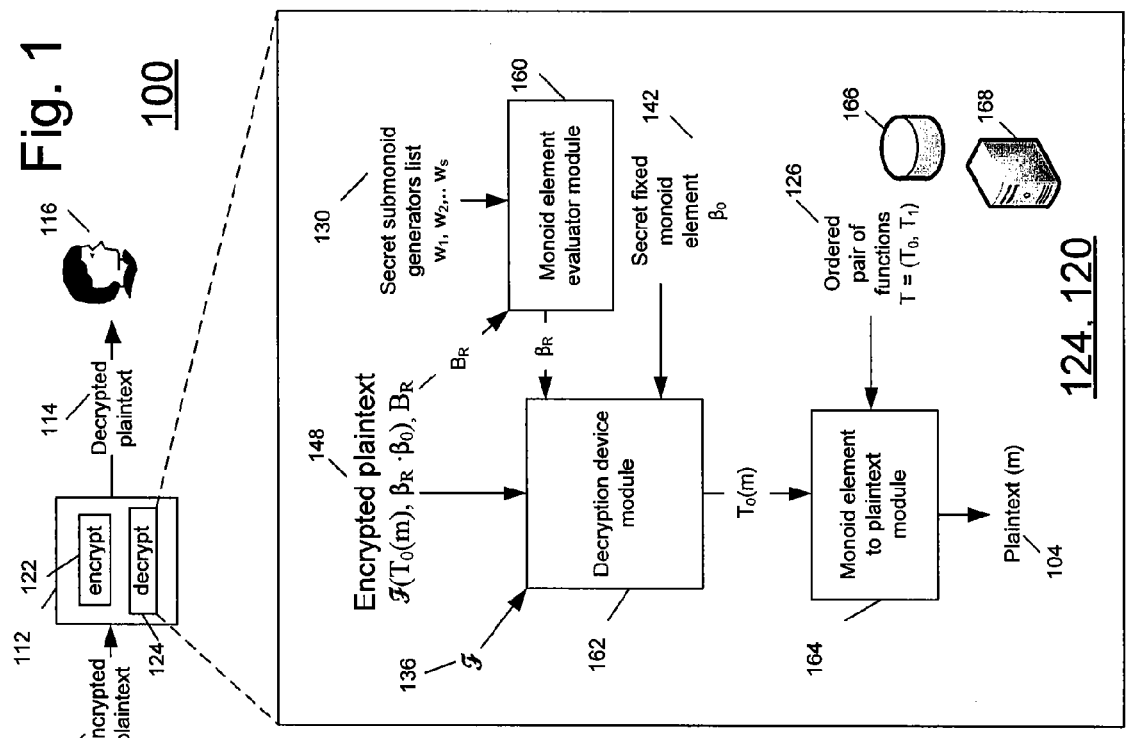
FIG. 1 is a system drawing of a communication system in accordance with an embodiment of the invention.
Figure 1:
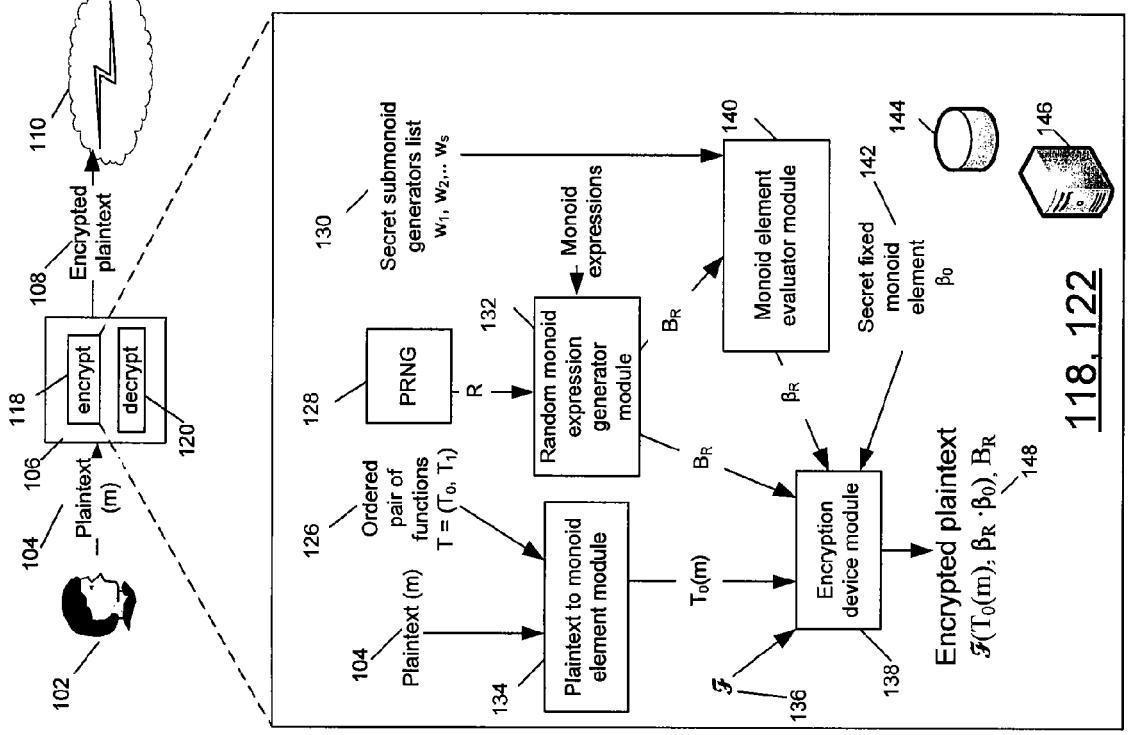

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Referring to FIG. 1, there is shown a communication system 100 which may be used in accordance with an embodiment of the invention. In communication system 100, a first device 106 may communicate with a second device 112 over a network 110. Network 110 may include, for example, a wireless network, a wired network, the Internet, a cellular network, a near field communication (NFC) network, a radio frequency identification (RF-ID) network, a cloud computing environment, etc.

First device 106 may be operated by a first user 102 and second device 112 may be operated by a second user 116. First device 106 may include an encryption module 118 and a decryption module 120. Similarly, second device 112 may include an encryption module 122 and a decryption module 124. Encryption module 118 may be configured to perform the same functions and operations as encryption module 122. Decryption module 120 may be configured to perform the same functions and operations as decryption module 124.

First device 106 may receive plaintext 104, such as from user 102, and encrypt plaintext 104 using encryption module 118 and a private key to produce encrypted plaintext 108. First device 106 may send encrypted plaintext 108 over network 110 to second device 122. Second device 122 may receive encrypted plaintext and decrypt encrypted plaintext 108 using the decryption module 124 and the private key to produce decrypted plaintext 114.

Encryption modules 118 and 122 may include an ordered pair of functions $T=(T_0, T_1)$ 126, a pseudorandom number generator (PRNG) 128, a secret submonoid generators list $w_1, w_2, \ldots w_s$ 130, a plaintext to monoid element module 134, and/or a random monoid expression generator module. The ordered pair of functions T, may include a first function $T_0$ effective to map text to a monoid element and second function $T_1$ which may be effective to map a monoid element to text. Encryption modules 118 and 122 may further include a function $\mathcal{F}$ 136, an encryption device module 138, a monoid element evaluator module 140 and/or a secret fixed monoid element $\beta_0$ 142. At least some of these modules may be in communication with a memory 144 and/or a processor 146. For example, data elements of the private key such as the ordered pair of functions $T=(T_0, T_1)$ 126, secret submonoid generators list $w_1, w_2, \ldots w_s$ 130, function $\mathcal{F}$ 136, and secret fixed monoid element $\beta_0$ 142 may be stored in memory 144. Processor 146 could have a relatively small processing power such as with a 5 MHz clock cycle. Memory 144 could have a relatively small size and have, for example, 1 kb of memory. Modules could be implemented as software such as with a processor and/or in hardware or firmware.

Plaintext 104 could be any data desired to be encrypted. For example, plaintext 104 may be a block of data m. A relatively large block of data may be broken into smaller blocks of data m to be encrypted. Function $T_0$ 126 may be effective to map letters in plaintext (m) 104 into monoid elements. Monoid elements may be, for example, matrices with entries in a finite field. Plaintext to monoid element module 134 may receive plaintext 104 and ordered pair of functions T 126, and apply function $T_0$ 126 to plaintext (m) 104 to produce monoid element $T_0(m)$. Monoid element $T_0(m)$ is forwarded to encryption device module 138. The ordered pair of functions $T=(T_0, T_1)$ 126 may be part of the private key used to encrypt and decrypt plaintext 104 as illustrated by the gray shading.

Pseudorandom number generator 128 may generate and forward a random integer number R to random monoid expression generator module 132. Random monoid expression generator module 132 may be in communication with memory 144. Memory 144 may include one or more monoid expressions. Random number R may be used by random monoid expression generator module 132 to select a random monoid expression $B_R$ with s variables. Random monoid expression $B_R$ is forwarded to encryption device module 138 and to monoid element evaluator module 140.

Secret submonoid generators list 130 may be stored in memory 144 and includes submonoid generators $w_1, w_2, \ldots w_s$. Submonoid generators $w_1, w_2, \ldots w_s$ are also part of the private key as illustrated by the gray shading. Monoid element evaluator module 140 receives random monoid expression $B_R$ and submonoid generators $w_1, w_2, \ldots w_s$. Monoid element evaluator module 140 inserts submonoid generators $w_1, w_2, \ldots w_s$ into monoid expression $B_R$ to produce monoid element $\beta_R$. Monoid element $\beta_R$ is forwarded to encryption device module 138. Secret fixed monoid element $\beta_0$ 142 is also sent to encryption device module 138 and is part of the private key, as illustrated by the gray shading.

Encryption device module 138 may receive function $\mathcal{F}$ 136, monoid element $T_0(m)$, monoid expression $B_R$, monoid element $\beta_R$, and monoid element $\beta_0$. Encryption device module 138 may apply function $\mathcal{F}$ 136 to monoid element $T_0(m)$, monoid expression $B_R$, monoid element $\beta_R$, and monoid element $\beta_0$ to produce encrypted plaintext 148. Encrypted plaintext 148 may include an ordered pair with a first entry that is a monoid element and a second entry that is the selected monoid expression: $\{\mathcal{F}(T_0(m), \beta_R \cdot \beta_0), B_R\}$.

Decryption modules 120 and 124 may include function $\mathcal{F}$ 136, secret submonoid generators list $w_1, w_2, \ldots w_s$ 130, a decryption device module 162, a monoid element evaluator module 160, secret fixed monoid element $\beta_0$ 142, a monoid element to plaintext module 164, and/or ordered pair of functions $T=(T_0, T_1)$ 126. At least some of these modules may be in communication with a memory 166 and/or a processor 168. For example, data elements of the private key such as ordered pair of functions $T=(T_0, T_1)$ 126, secret submonoid generators list $w_1, w_2, \ldots w_s$ 130, one way function $\mathcal{F}$ 136, and secret fixed monoid element $\beta_0$ 142 may be stored in memory 166. Processor 168 could have relatively small processing power such as with a 5 MHz clock cycle. Memory 166 could be relatively small in size and have, for example, 1 kb of memory. As both encryption modules 118, 122 and decryption modules 120, 124 may be in the same device, common modules, processing and data may be shared among these modules. For example, encryption module 118 and decryption module 120 may share the same memory, processor or monoid element evaluator module.

As shown, decryption module 124 may receive encrypted plaintext 148 and forward the monoid element $\mathcal{F}(T_0(m), \beta_R \cdot \beta_0)$ of encrypted plaintext 148 to decryption device module 162. Function $\mathcal{F}$ 136 is forwarded to decryption device module 162. Monoid expression $B_R$, the second element of encrypted plaintext 148, may be extracted from encrypted plaintext 148 and forwarded to monoid element evaluator module 160. Monoid element evaluator module 160 may also receive submonoid generators $w_1, w_2, \ldots w_s$ of secret submonoid generators list 130. Monoid element evaluator module 160 may re-produce monoid element $\beta_R$ by inserting submonoid generators list $w_1, w_2, \ldots w_s$ 130 into monoid expression $B_R$. Monoid element evaluator module 160 may forward monoid expression $\beta_R$ to decryption device module 162.

Decryption device module 162 may receive secret fixed monoid element $\beta_0$, monoid element $\beta_R$, function $\mathcal{F}$ 136, and encrypted plaintext 148. Decryption device module 162 may apply function $\mathcal{F}$ 136 to the inverse of secret fixed monoid element $\beta_0$, the inverse of monoid element $\beta_R$, and the first element of encrypted plaintext 148 to re-produce monoid element $T_0(m)$ as shown below.

$$\mathcal{F}(T_0(m),\beta_R\cdot\beta_0)\circ 0\ \beta_0^{-1}\circ\beta_R^{-1}=$$

$$\mathcal{F}(T_0(m),\beta_R\cdot\beta_0\cdot\beta_0^{-1}\cdot\beta_R^{-1})=$$

$$\mathcal{F}(T_0(m),1_M)=T_0(m).$$

Decryption device module 162 may forward monoid element $T_0(m)$ to monoid element to plaintext module 164. Monoid element to plaintext module 164 may apply function $T_1$ 126 to monoid element $T_0(m)$ to re-produce plaintext m 104.

Function $\mathcal{F}$ may be a one-way function that is computable but difficult to reverse. In an example, an instance of a one-way function based symmetric encryption protocol utilizes an Algebraic Eraser. An Algebraic Eraser may include a specified 6-tuple (M ⋉ S, N, Π, E, A, B) where M and N are monoids,
S is a group that acts on M (on the left),
M ⋉ S denotes the semi-direct product,
A and B denote submonoids of M ⋉ S, and
Π denotes a monoid homomorphism from M to N. The E-function, also called E-multiplication, is defined by $$E:(N\times S)\times(M\ltimes S)\to(N\times S)$$

$$E((n,s),(m_1,s_1))=(n\Pi(^s m_1), s\ s_1).$$

It is observed that the E-function satisfies the following identity:

$$E((n,s),((m_1,s_1)\cdot(m_2,s_2)))=E(E((n,s),(m_1,s_1)),(m_2,s_2)).$$

Function $\mathcal{F}$ may be an Algebraic Eraser (M ⋉ S, N, Π, E, A, B). Letting M=M ⋉ S, N =N ⋉ S, function $\mathcal{F}$ is defined as follows: given $(n_0,s_0)\in N\ltimes S$ and $(m,s_1)\in M\ltimes S$ let $\mathcal{F}: N\times M\to N$ denote the function:

$$\mathcal{F}((n_0,s_0),(m,s_1))=E((n_0,s_0),(m,s_1))=((n_0\Pi(^{s_0}m),s_0\ s_1).$$

The above E-function identity enables the following definition of a right action: given an arbitrary element $(n,s)\in N$, and $(m,s_1)\in M$, define the right action of $(m,s_1)$ on $n=(n_0,s_0)$ by $$(n_0,s_0)\circ(m,s_1)=E((n_0,s_0),(m,s_1))=((n_0\Pi(^{s_0}m),s_0 s_1).$$

The identities may be:

$$\mathcal{F}(n,g_1 g_2)=\mathcal{F}(n,g_1)\circ g_2,$$

and $$\mathcal{F}(n,1_M)=n$$

for all n ∈ N, $g_1,g_2$ ∈ M. Said identities are seen to be valid: for all $g_i=(m_i,s_i)$, i=1, 2, and $n=(n_0,s_0)$, $$\mathcal{F}(n, g_1\cdot g_2) =$$

$$E((n_0, s_0), ((m_1, s_1)\cdot(m_2, s_2))) = E((n_0, s_0), (m_1{}^{s_1}m_2, s_1 s_2)) =$$

$$(n_0\Pi(^{s_0}(m_1{}^{s_1}m_2)), s_0 s_1 s_2) = (n_0\Pi(^{s_0}(m_1))\Pi(^{s_0 s_1}m_2)),$$

$$s_0 s_1 s_2 = E((n_0\Pi(^{s_0}(m_1)), s_0 s_1), (m_2, s_2)) =$$

$$E(\mathbb{E}((n_0, s_0), (m_1, s_1)), (m_2, s_2)) = \mathcal{F}(n, g_1)\circ g_2$$

Furthermore, letting $1_M$, $1_S$, denote the identity elements of M,S, respectively, $$\mathcal{F}(n,1_M)=E((n_0,s_0),(1_M,1_S))=((n\Pi(1_M),s_0\cdot 1_S)=(n,s_0),$$

since $s_0$ acting on the $\Pi(1_M)$, results in $1_M$, $\Pi(1_M)=1_M$, and $s_0\cdot 1_S=s_0$. This demonstrates that this function may be used to produce a symmetric encryption protocol as described herein.

Another instance of a function that may be used is a function where monoids M and N are chosen to be a group G. Defining relators of G may allow for an effective rewriting or cloaking of group elements, and a conjugacy equation in G may be relatively difficult to solve. This insures that the function $\mathcal{F}: G\times G\to G$ defined by the equation, $$\mathcal{F}(x,g)=g^{-1}x g=^{\mathcal{C}}(g^{-1}x\ g),$$

where x, g ∈ G, is a one-way function. In this setting it may be desirable to rewrite or cloak the output of the encryption mechanism. Let G act on itself by conjugation: if $g,g_1\in G$, define $$g\circ g_1=g_1^{-1}g\ g_1.$$

$\mathcal{F}(x,g_1 g_2)=\mathcal{F}(g_1)\circ g_2$, is easily verified:

$$\mathcal{F}(x, g_1 g_2) = (g_1 g_2)^{-1}x(g_1 g_2) =$$

$$g_2^{-1}g_1^{-1}x g_1 g_2 = g_2^{-1}(g_1^{-1}x g_1)g_2 = g_2^{-1}\mathcal{F}(x, g_1)g_2 = \mathcal{F}(g_1)\circ g_2.$$

This demonstrates that the function $\mathcal{F}$ can be in the symmetric encryption protocol described herein.

Among other benefits, using a system in accordance with this disclosure may produce a secure communication system with a relatively simple processor and a small memory. Environments with relatively simple devices can be provided with secure communication capability. Messages can be encrypted and decrypted relatively quickly.

Figure 2:
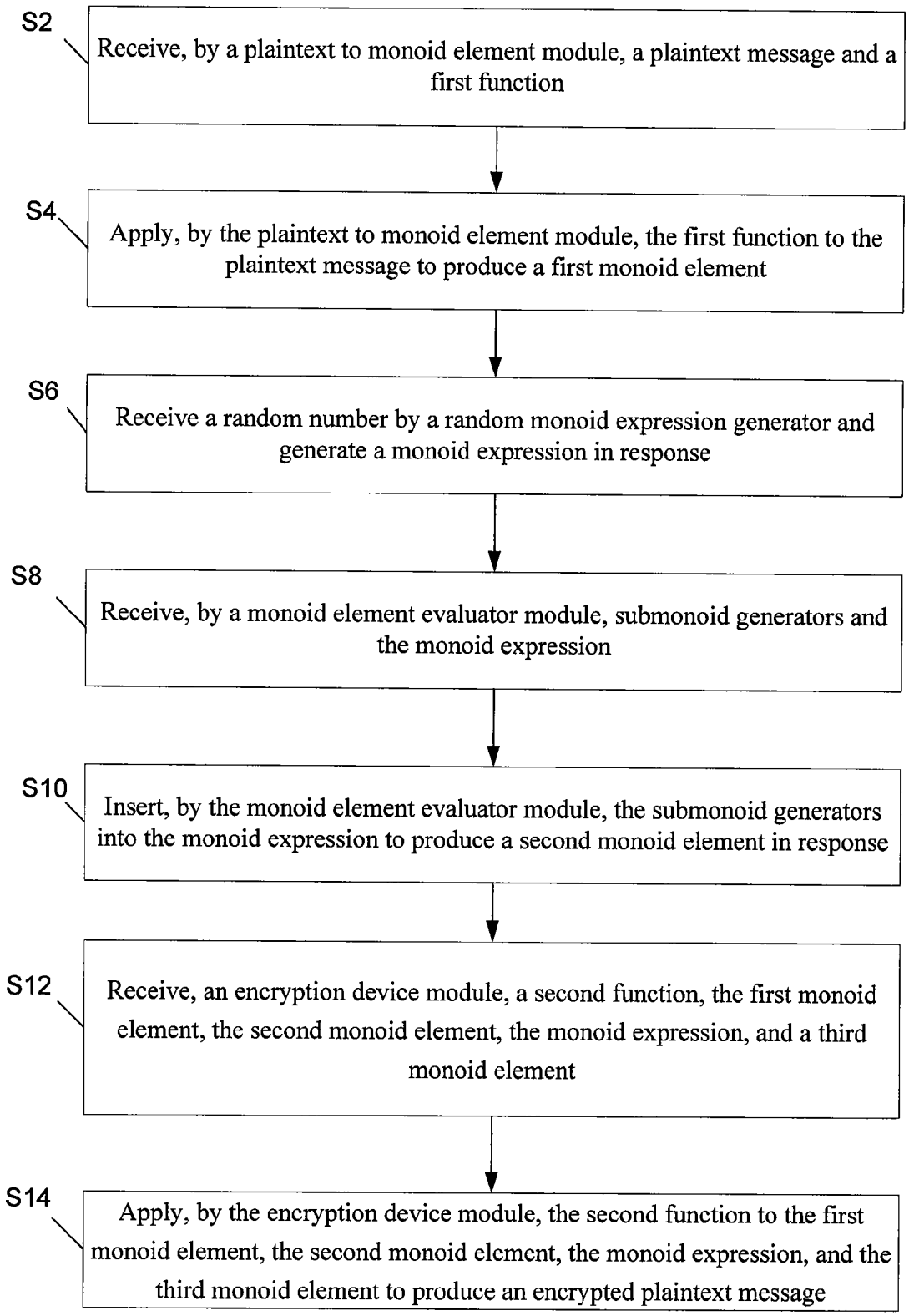
FIG. 2 is a flow diagram illustrating a process which could be performed in accordance with an embodiment of the invention.

Referring to FIG. 2, there is shown a process which could be performed in accordance with an embodiment of the invention. The process could be performed using, for example, system 100 discussed above.

As shown, at step S2, a plaintext to monoid element module may receive a plaintext message and a first function. At step S4, the plaintext to monoid element module may apply the first function to the plaintext message to produce a monoid element. At step S6, a random monoid expression generator may receive a random number and generate a monoid expression in response.

At step S8, a monoid element evaluator module may receive submonoid generators and the monoid expression. At step S10, the monoid element evaluator module may insert the submonoid generators into the monoid expression and produce a second monoid element in response. At step S12, an encryption device module may receive a second function, the first monoid element, the second monoid element, the monoid expression, and a third monoid element. At step S14, the encryption device module may apply the second function to the first monoid element, the second monoid element, the monoid expression, and the third monoid element to produce an encrypted plaintext message.

Figure 3:
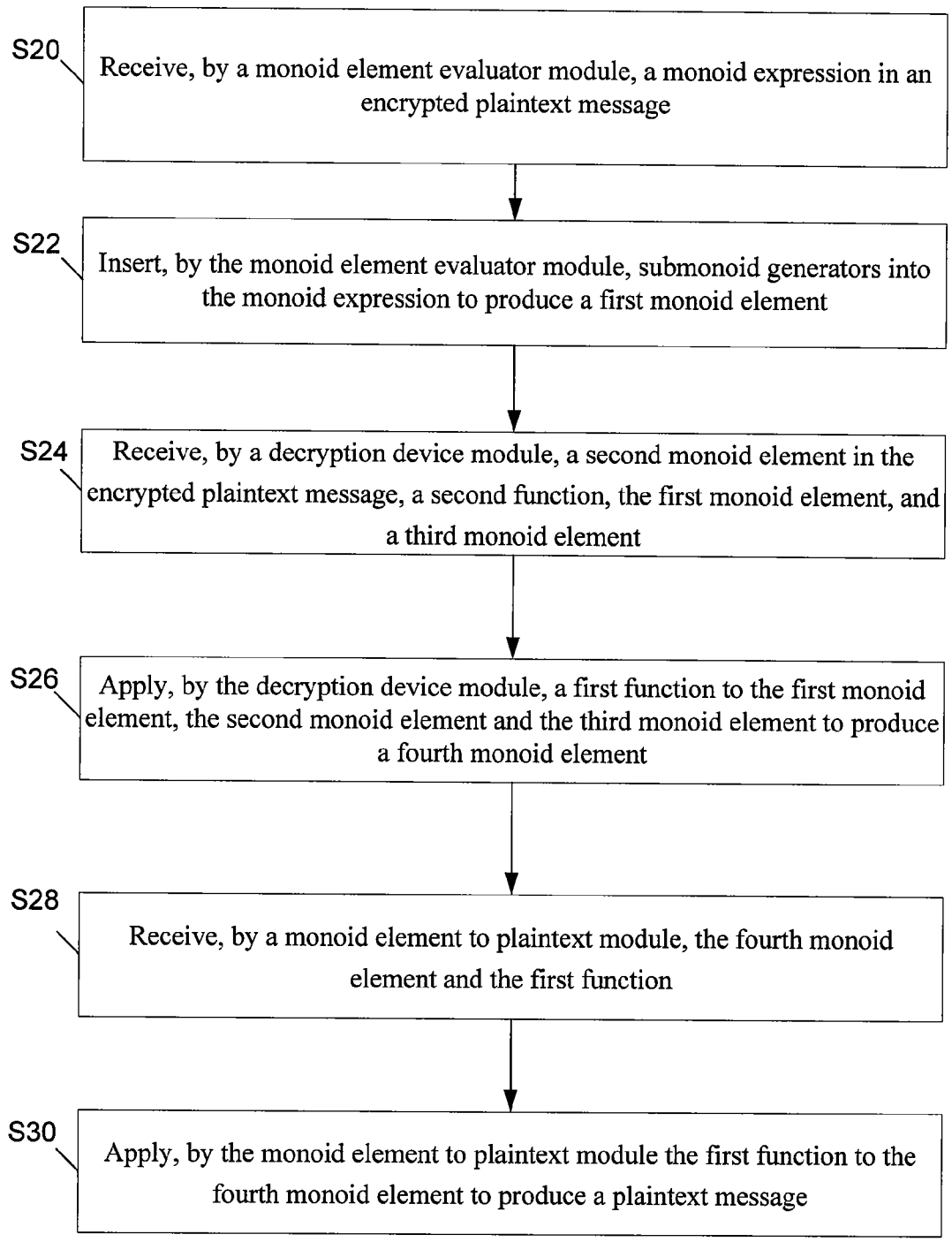
FIG. 3 is a flow diagram illustrating a process which could be performed in accordance with an embodiment of the invention.

Referring to FIG. 3, there is shown a process which could be performed in accordance with an embodiment of the invention. The process could be performed using, for example, system 100 discussed above.

As shown, at step S20, a monoid element evaluator module may receive a monoid expression in an encrypted plaintext message. At step S22, the monoid element evaluator module may insert submonoid generators into the monoid expression to produce a first monoid element. At step S24, a decryption device module may receive a second monoid element in the encrypted plaintext message, a second function, the first monoid element, and a third monoid element. At step S26, the decryption device module may apply a first function to the first monoid element, the second monoid element and the third monoid element to produce a fourth monoid element. At step S28, a monoid element to plaintext module may receive the fourth monoid element and a second function. At step S30, the monoid element to plaintext module may apply the second function to the fourth monoid element to produce a plaintext message.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device effective to communicate a message, the device comprising:
   a memory, wherein the memory is effective to include
     a first function,
     a list of submonoid generators,
     a second function, and
     a first monoid element,
   a first module in communication with the memory, the first module effective to receive a message and apply the first function to the message to produce a second monoid element;
   a second module in communication with the memory, the second module effective to receive and insert the submonoid generators into at least one monoid expression to produce a third monoid element; and
   a third module in communication with the memory, in communication with the first module, and in communication with the second module, the third module effective to apply the second function to the first monoid element, the second monoid element, the monoid expression, and the third monoid element to produce an encrypted message.

2. The device as recited in claim 1, further comprising:
   a random number generator effective to produce a random number; and
   a fourth module in communication with the random number generator and the memory, the fourth module effective to receive the random number and generate the monoid expression in response.

3. The device as recited in claim 1, wherein the encrypted message includes an ordered pair with a first entry that is a fourth monoid element and a second entry that is the monoid expression.

4. The device as recited in claim 1, wherein the second function is a one way function.

5. The device as recited in claim 1, wherein the second function is a 6-tuple (M ⋉ S, N, Π, E, A, B) where
   M and N are monoids,
   S is a group that acts on M,
   M ⋉ S denotes the semi-direct product,
   A and B denote submonoids of M ⋉ S,
   Π denotes a monoid homomorphism from M to N,
   E is defined by $$E:(N \times S) \times (M \ltimes S) \to (N \times S)$$

$$E((n,s),(m_1,s_1)) = (n \, \Pi({}^s m_1), s \, s_1),$$

$$M = M \ltimes S, N = N \ltimes S,$$

and the function $\mathcal{F}$ is defined as: given $(n_0, s_0) \in N \ltimes S$ and $(m, s_1) \in M \ltimes S$ let $\mathcal{F} : N \times M \to N$ denote the function:

$$\mathcal{F}((n_0, s_0),(m, s_1)) = E((n_0, s_0),(m, s_1)) = ((n_0 \, \Pi({}^{s_0} m), s_0 s_1).$$

6. The device as recited in claim 1, wherein the second function is selected such that monoids M and N are chosen to be a group G and $$\mathcal{F}(x, g) = g^{-1} x g = \mathcal{C}(g^{-1} x g),$$

where $x, g \in G$.

7. The device as recited in claim 1, wherein:
   the message is a first message;
   the monoid expression is a first monoid expression;
   the encrypted message is a first encrypted plaintext message;
   the device is effective to receive a second encrypted message including a fourth monoid element and a second monoid expression, and
   the second module is effective to receive the second monoid expression and insert the submonoid generators into the second monoid expression to produce a fifth monoid element;
   and the device further comprises:
   a fourth module in communication with the memory and the second module, the fourth module effective to
     receive the fourth monoid element in the second encrypted plaintext message,
     receive the second function,
     receive the first monoid element,
     receive the fifth monoid element, and
     apply the second function to the fourth monoid element, the inverse of the fifth monoid element and the inverse of the first monoid element to produce a sixth monoid element;
   a fifth module in communication with the memory and the fourth module, the fifth module effective to receive the sixth monoid element and the first function, and apply the first function to the sixth monoid element to produce a second message.

8. The device as recited in claim 1, wherein:
   the message is a first message
   and the device further comprises:
   a random number generator effective to produce a first random number; and
   a fourth module in communication with the random number generator and the memory, the fourth module effective to receive the first random number and generate the monoid expression in response, where the monoid expression is a first monoid expression; and wherein
   the first module is effective to receive a second message and apply the first function to the second message to produce a fourth monoid element;
   the random number generator is further effective to produce a second random number;
   the fourth module is further effective to receive the second random number and generate a second monoid expression in response;

the second module is effective to receive and insert the submonoid generators into the second monoid expression to produce a fifth monoid element; and the third module is effective to apply the second function to the first monoid element, the fourth monoid element, the second monoid expression, and the fifth monoid element to produce another encrypted message.

9. The device as recited in claim 1, further comprising:
a random number generator effective to produce a random number; and
a fourth module in communication with the random number generator and the memory, the fourth module effective to receive the random number and generate the monoid expression in response; wherein
the encrypted message includes an ordered pair with a first entry that is a fourth monoid element and a second entry that is the monoid expression;
the first function is a mapping function; and
the second function is a one way function.

10. A device effective to decrypt an encrypted message, the device comprising:
a memory, wherein the memory is effective to include
a first function,
a list of submonoid generators,
a second function, and
a first monoid element,
a first module in communication with the memory, the first module effective to receive a monoid expression in the encrypted message, the first module effective to insert the submonoid generators into the monoid expression to produce a second monoid element;
a second module in communication with the memory and the first module, the second module effective to
receive a third monoid element in the encrypted message,
receive the second function,
receive the first monoid element,
receive the second monoid element, and
apply the second function to the third monoid element, to the inverse of the second monoid element, and to the inverse of the first monoid element to produce a fourth monoid element;
a third module in communication with the memory and the second module, the third module effective to apply the first function to the fourth monoid element to produce the message.

11. The device as recited in claim 10, wherein the second function is a one way function.

12. The device as recited in claim 10, wherein the second function is a 6-tuple $(M \ltimes S, N, \Pi, E, A, B)$ where
M and N are monoids,
S is a group that acts on M,
$M \ltimes S$ denotes the semi-direct product,
A and B denote submonoids of $M \ltimes S$,
$\Pi$ denotes a monoid homomorphism from M to N,
E is defined by $$E: (N \times S) \times (M \ltimes S) \to (N \times S)$$

$$E((n,s),(m_1,s_1)) = (n\Pi(^E m_1), s\, s_1')|,$$

$$M = M \ltimes S, N = N \ltimes S,$$

and the function $\mathcal{F}$ is defined as: given $(n_0, s_0) \in N \ltimes S$ and $(m, s_1) \in M \ltimes S$ let $\mathcal{F}: N \times M \to N$ denote the function:

$$\mathcal{F}((n_0, s_0),(m,s_1)) = E((n_0,s_0),(m,s_1)) = ((n_0 \Pi(^{s_0} m), s_0 s_1).$$

13. The device as recited in claim 10, wherein the second function is selected such that monoids M and N are chosen to be a group G and $$\mathcal{F}(x,g) = g^{-1} x g = {}^{\mathcal{C}}(g^{-1} x g),$$

where $x, g \in G$.

14. A system effective to communicate a message, the system comprising:
a first device in communication with a second device over a network;
wherein the first device includes
a first memory, wherein the first memory is effective to include
a first function,
a list of submonoid generators,
a second function, and
a first monoid element,
a first module in communication with the first memory, the first module effective to receive a message and apply the first function to the message to produce a second monoid element;
a second module in communication with the memory, the second module effective to receive and insert the submonoid generators into at least one monoid expression to produce a third monoid element; and
a third module in communication with the memory, in communication with the first module, and in communication with the second module, the third module effective to apply the second function to the first monoid element, the second monoid element, the monoid expression, and the third monoid element to produce an encrypted message including a fourth monoid element and the monoid expression;
wherein the second device includes
a second memory, wherein the second memory is effective to include
the first function,
the list of submonoid generators,
the second function, and
the first monoid element,
a fourth module in communication with the second memory, the fourth module effective to receive the monoid expression in the encrypted message, the fourth module effective to insert the submonoid generators into the monoid expression to re-produce the third monoid element;
a fifth module in communication with the second memory and the fourth module, the fifth module effective to
receive the fourth monoid element in the encrypted message,
receive the second function,
receive the first monoid element,
receive the third monoid element, and
apply the second function to the fourth monoid element, the inverse of the first monoid element and the inverse of the third monoid element to produce the second monoid element; and
a sixth module in communication with the second memory and the fifth module, the sixth module effective to apply the first function to the second monoid element to re-produce the message.

15. The system as recited in claim 14, wherein the network is a near field communications network 16. The system as recited in claim 14, wherein:
the network is an RF-ID network,
the first device is one of a tag or a reader; and
the second device is the other of the tag or the reader.

17. The system as recited in claim 14, wherein the first device further comprises:
a random number generator effective to produce a random number; and
a seventh module in communication with the random number generator, the seventh module effective to receive the random number and generate the monoid expression in response.

18. The system as recited in claim 14, wherein the second function is a one way function.

19. The system as recited in claim 14, wherein the second function is a 6-tuple (M ⋉ S, N, Π, E, A, B) where
M and N are monoids,
S is a group that acts on M,
M ⋉ S denotes the semi-direct product,
A and B denote submonoids of M ⋉ S,
Π denotes a monoid homomorphism from M to N,
E is defined by $$E: (N \times S) \times (M \ltimes S) \to (N \times S)$$

$$E((n,s),(m_1,s_1)) = (n\Pi(^s m_1), s\, s_1),$$

$$M = M \mathcal{F} \, S, \quad N = N \ltimes S,$$

and the function $\mathcal{F}$ is defined as: given $(n_0, s_0) \in N \ltimes S$ and $(m, s_1) \in M \ltimes S$ let $\mathcal{F}; N \times M \to N$ denote the function:
$$\mathcal{F}((n_0, s_0), (m, s_1)) = E((n_0, s_0), (m, s_1)) = ((n_0 \Pi(^{s_0} m), s_0\, s_1).$$

20. The system as recited in claim 14, wherein the first device further comprises:
a random number generator effective to produce a random number; and
a seventh module in communication with the random number generator, the seventh module effective to receive the random number and generate the monoid expression in response; wherein
the first function is a mapping function; and
the second function is a one way function.

\* \* \* \* \*